United States Patent [19]

Chan, Jr.

[11] 4,002,774
[45] Jan. 11, 1977

[54] METHOD FOR REMOVING SEEDS FROM PAPAYAS

[75] Inventor: Harvey T. Chan, Jr., Honolulu, Hawaii

[73] Assignee: The United States of America as represented by the Secretary of Agriculture, Washington, D.C.

[22] Filed: Aug. 20, 1975

[21] Appl. No.: 605,983

[52] U.S. Cl. .............................. 426/484; 426/518; 426/809
[51] Int. Cl.² ...................... A23P 1/00; A23N 4/24
[58] Field of Search .......... 426/484, 485, 478, 479, 426/481, 518, 809, 615

[56] References Cited

UNITED STATES PATENTS

| | | | |
|---|---|---|---|
| 3,117,605 | 1/1964 | Creed et al. | 426/484 |
| 3,314,463 | 4/1967 | Keesling | 426/484 |
| 3,473,588 | 10/1969 | Loveland | 426/484 X |

FOREIGN PATENTS OR APPLICATIONS 1,797,969  8/1969  Japan ............................... 426/484

*Primary Examiner*—S. Leon Bashore
*Assistant Examiner*—Kenneth M. Schor
*Attorney, Agent, or Firm*—M. Howard Silverstein; David G. McConnell; Max D. Hensley

[57] ABSTRACT

The blossom and stem ends of a papaya are sliced off to expose the seed cavity, and the seeds therein are blown out by a jet of fluid.

4 Claims, No Drawings

METHOD FOR REMOVING SEEDS FROM PAPAYAS

DESCRIPTION OF THE INVENTION

The invention relates to and has among its objects the provision of novel methods for removing the seeds from papayas. The term "papaya" is used herein to designate the fruit commonly known by that name. The botanical name is *Carica papaya*.

The papaya is a fruit of elongated globular shape. Beneath the skin is a thick layer of orange-yellow flesh (the edible portion). There is also a large central cavity which contains a multitude of black seeds about the size of small peas.

In converting papayas into manufactured products such as canned or frozen slices or pieces, purees for the production of preserves, jellies, sherbets, etc., it is necessary to completely remove the seeds because of their dark color and undesirable flavor. In the preparation of piece-form products, it is customary to cut the fruit in two and scoop out the seeds with a spoon or similar tool. Such method of seed removal is effective but expensive. In preparing liquiform products such as purees, it has been advocated to pulp the entire fruit and then remove the seeds and skin fragments by screening. This procedure has the disadvatage that the pulping causes intimate contact between the pureed flesh and ruptured sarcotesta and seeds with consequent development of off-flavor and off-color in the product.

It is a primary object of the invention to provide means for obviating the problems outlined above. The invention provides a simple, effective, and inexpensive method of removing the seeds from papayas, whereby products of good color and flavor can be economically prepared.

In a practice of the invention, the following steps are applied:

1. The blossom end of the papaya is cut off to expose the blossom end of the seed cavity. Usually this cut is made about 1¼ inch in from the blossom tip of the fruit.
2. The stem end of the papaya is cut off to expose the stem end of the seed cavity. Usually this cut is made about 1¼ inch in from the stem tip of the fruit.
3. A nozzle is placed at the stem end of the seed cavity. A source of fluid under pressure is connected to the nozzle whereby a jet of fluid is directed into the seed cavity with the result that the seeds are blown out the blossom end of the cavity.

The fluid used is generally air or water or a mixture of both. However, other non-toxic fluids such as carbon dioxide, nitrogen, mixtures of steam and air, brine, etc. can be used. The pressure required to blow out the seeds will depend on such factors as the size of the nozzle, the maturity of the fruit, etc. In any particular case the appropriate pressure to use can be readily determined by pilot trials at various pressures with observation of the fruit to note the degree of seed removal attained.

Having thus described the invention, what is claimed is:

1. A method for removing the seeds from a papaya, which consists of
   a. cutting off the blossom end of the papaya to expose the blossom end of the seed cavity.
   b. cutting off the stem end of the papaya to expose the stem end of the seed cavity,
   c. applying a jet of fluid to the stem end of the seed cavity, the jet having sufficient force to create a pressure in the seed cavity effective to cause the seeds within the cavity to be blown out the blossom end of the seed cavity.
2. The method of claim 1 wherein the fluid is air.
3. The method of claim 1 wherein the fluid is water.
4. The method of claim 1 wherein the fluid is a mixture of air and water.

* * * * *